UNITED STATES PATENT OFFICE.

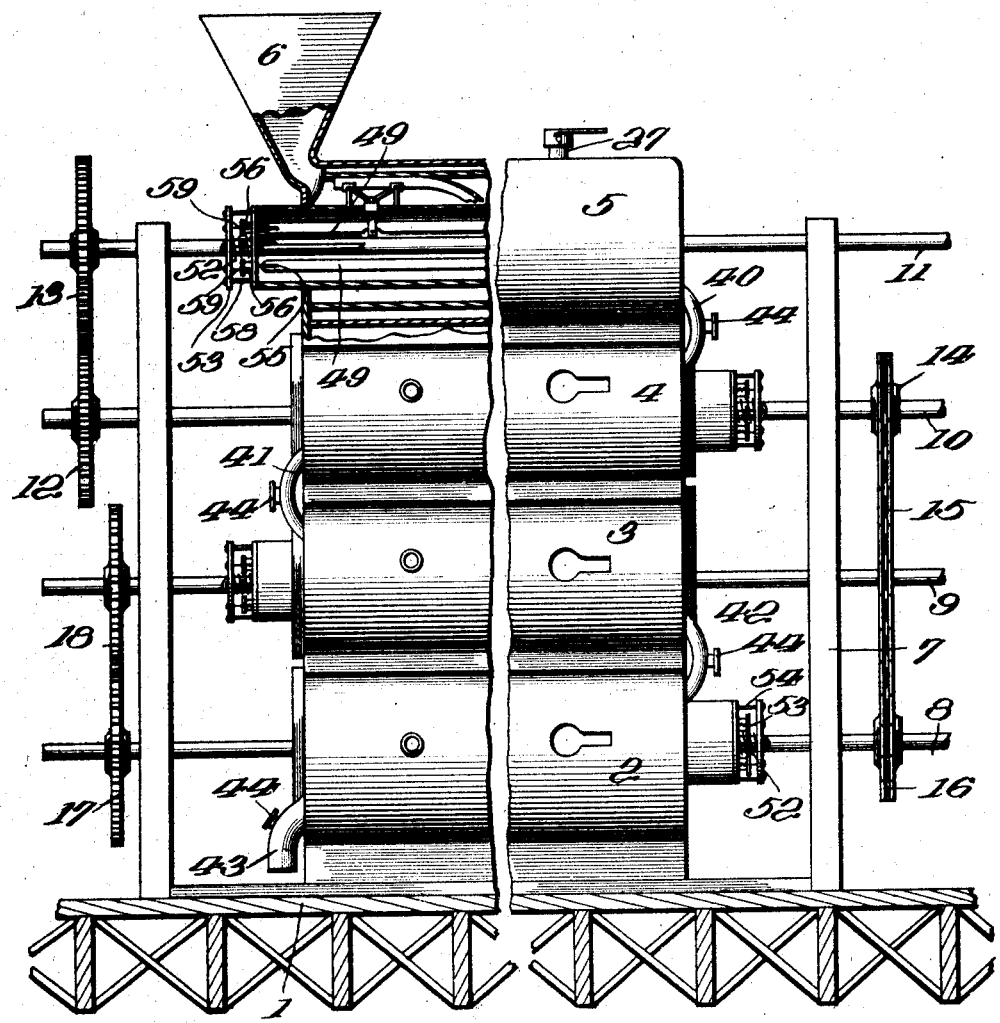

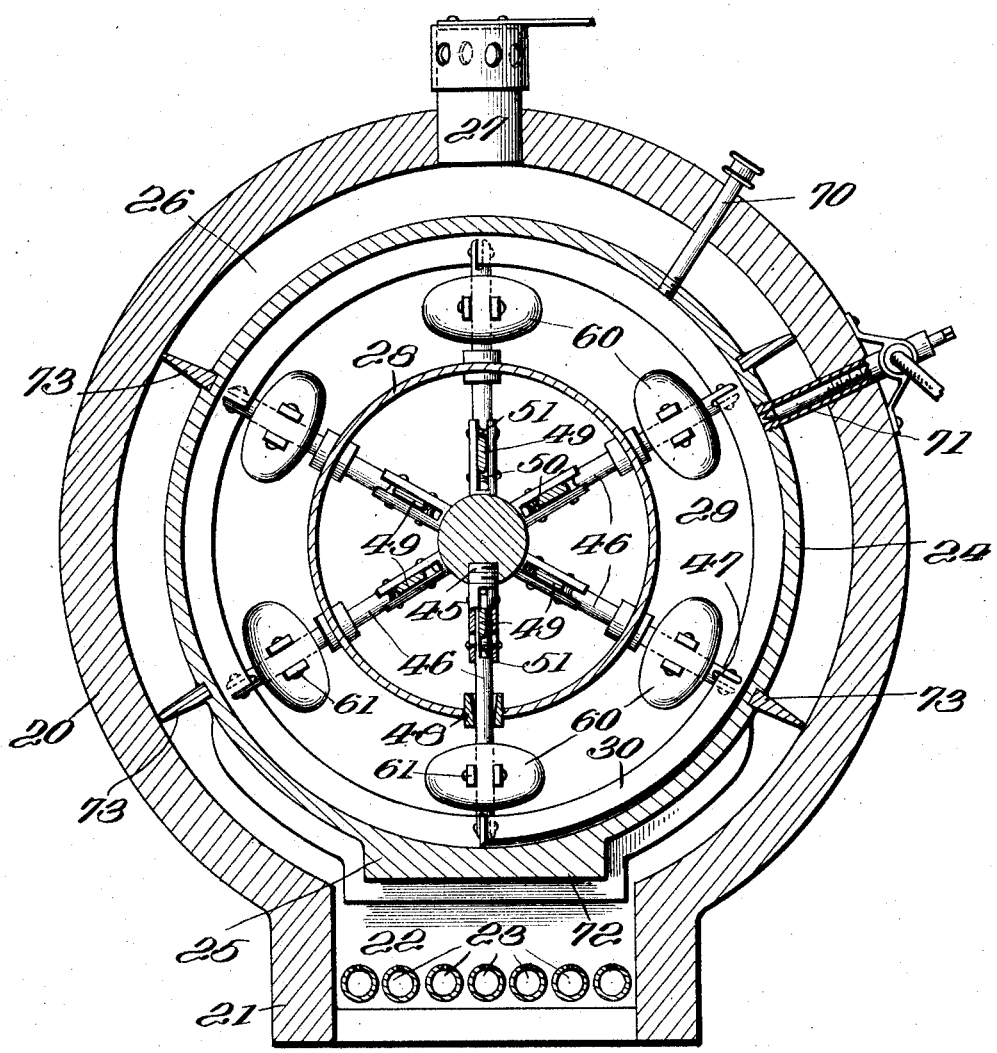
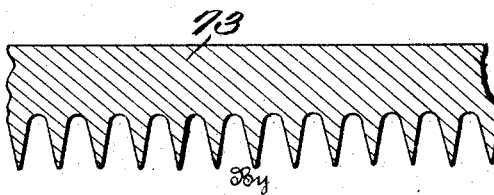

SAMUEL I. BEAN AND ROBERT M. BIZZELL, OF ASHEVILLE, NORTH CAROLINA.

CEREAL-ROASTER.

1,302,124. Specification of Letters Patent. Patented Apr. 29, 1919.

Original application filed July 17, 1917, Serial No. 181,125. Divided and this application filed May 7, 1918. Serial No. 233,076.

*To all whom it may concern:*

Be it known that we, SAMUEL I. BEAN and ROBERT M. BIZZELL, citizens of the United States, residing at Asheville, in the county of Buncombe and State of North Carolina, have invented certain new and useful Improvements in Cereal-Roasters, of which the following is a specification, reference being had therein to the accompanying drawing.

This invention relates to certain new and useful improvements in cereal roasters and comprises a division of our application filed July 17, 1917, Serial No. 181,125, the object being to provide a roasting apparatus which is formed of a series of units connected together in such a manner that the material being roasted is delivered from one unit into the oven chamber of the next unit and so on through all of the units so that material can be roasted quickly, and by this construction one or more of the units can be used for roasting.

Another and further object of the invention is to provide a governor in connection with the conveyer and scraper so as to cause the sections thereof to be forced outwardly as the wall of the oven chamber expands in order to maintain the edge of the conveyer in contact with the wall of the oven chamber at all times.

Another and further object of the invention is to provide a roasting apparatus which is exceedingly simple and cheap in construction and one in which the units are arranged in superposed position so as to occupy a small space, the material being roasted being fed by gravity from one unit to the next unit.

Another and further object of the invention is to provide each unit with an annular oven chamber surrounded by an annular combustion chamber, the oven chamber and combustion chamber each being provided with a valve-controlled vent whereby the temperature of the oven chamber can be regulated in order to obtain a uniform degree of heat within the same so as to roast the material passing therethrough properly in such a manner that all danger of the material being burnt is eliminated.

Other and further objects and advantages of the invention will be hereinafter set forth and the novel features thereof defined by the appended claims.

In the drawings,

Figure 1 is a side elevation of a roasting apparatus partly in section constructed in accordance with our invention;

Fig. 2 is an enlarged vertical transverse section through the upper unit of the roasting apparatus;

Fig. 3 is a section through one of the buffers.

Like numerals of reference refer to like parts in the several figures of the drawing.

In the drawing 1 indicates a suitable base on which is mounted the base unit 2 of our improved construction of cereal roaster which has mounted thereon superposed units 3, 4 and 5 constructed substantially identically alike with the exception of the base unit and top unit 5 which top unit is provided with a feed hopper 6.

Arranged at each side of the superposed units is a standard 7 provided with bearings in which are mounted shafts 8, 9, 10 and 11 extending through the units 2, 3, 4 and 5, the shaft 11 being adapted to be driven by any suitable power such as a drive belt or any other suitable driving gear not shown.

The shafts 10 and 11 carry meshing gears 12 and 13 at one end in order to drive the shaft 11 from the shaft 10. The opposite end of the shaft 10 carries a sprocket wheel 14 over which passes a sprocket chain 15 which passes over a sprocket wheel 16 mounted on the shaft 8 so as to drive said shaft. The opposite ends of the shafts 8 and 9 are provided with meshing gear wheels 17 and 18 for driving the shaft 8 from the shaft 9 and it will be seen that by this construction the adjacent shafts are driven in opposite directions for the purpose hereinafter fully described.

The units of the apparatus are constructed substantially alike and the description of one unit is sufficient for all. Each unit comprises an outer casing 20 substantially cylindrical in form having an offset base portion 21 provided with a burner chamber 22 in which are mounted burners 23 herein shown as gas burners, it is of course being understood that any other heating medium could be employed if desired, and we do not wish to limit ourselves to any particular heating medium.

Arranged concentrically within the casing 20 is a cylindrical oven casing 24 which is provided with an offset base portion 25 a portion of which extends into the burner chamber 22 in order to form a heat-absorbing portion which has a greater thickness than the remaining portion of the casing so that the oven casing which is exposed to the greatest amount of heat will not be over heated by the burners within the burner chamber, and this offset portion has a width slightly less than the oven chamber in order to allow the products of combustion from the burner chamber 22 to pass into the annular combustion chamber 26 formed by the casing 20 and the oven casing 24. The combustion chamber 24 is provided with a valve-controlled vent 27 so as to control the passage of the products of combustion around the oven casing. The base 25 of the oven casing 24 is formed fluted or serrated to provide a series of parallel arranged substantially V-shaped ribs as shown at 72 in Fig. 2 of the drawing, so that the point of application of the heat the products of combustion will be broken up and caused to circulate around the base of the oven chamber. In order to reduce the velocity of the products of combustion in their passage around the oven chamber, we provide the combustion chamber with a series of serrated retarding baffles 73 which are preferably seated in grooves formed in the oven casing 24.

Arranged concentrically around each of the shafts 8, 9, 10 and 11 within the units 2, 3, 4 and 5 of the roasting apparatus is a pipe 28 which forms an annular oven chamber 29 in which is mounted a sectional spiral conveyer and scraper 30 adapted to cause the material in the oven chamber to be carried longitudinally thereof so that the material being fed into the upper oven chamber through the hopper 6 will be discharged into the substantially U-shaped spout 40 from which it passes by gravity into the oven chamber of the unit 4 and is conveyed in an opposite direction by the conveyer arranged therein and is discharged into the spout 41 from which it is discharged into the unit 3 and is carried through the oven chamber thereof and discharged into the spout 42 into the oven chamber of the unit 2 and is discharged therefrom through the spout 43. Each of these spouts are provided with a sight opening 44 in order to allow the material being roasted to be inspected so that the same will be prevented from being burned by an excessive heating of the oven which sight openings also form a manhole in order to allow the same to be cleaned out if desired.

The sectional spiral conveyer 30 is supported by a plurality of sectional studs formed of a base section 45 secured within the shaft and an outer section 46 which is slidably connected to the base section 45, the outer section 46 being slidably connected as shown at 47 to the respective section of the spiral conveyer 30. These studs are arranged spirally on the shaft and the pipe 28 is connected to the shaft so as to rotate therewith, the outer section 46 of the studs extending through bearing sleeves 48 formed in the pipe 28 as clearly shown in Fig. 2. In order to provide means for holding the outer sections 46 of the studs outwardly we arrange within the pipe 28 a pair of longitudinally disposed pressure bars 49 which are adapted to pass between the inner and outer sections of the studs, said sections carrying anti-friction rollers 50 and 51, and the pressure bars are provided with notched portions forming inclined faces so that when moved longitdinally in respect to the studs the outer sections of the studs will be expanded so as to move the spiral sections of the conveyer carried thereby outwardly in contact with the inner surface of the oven chamber. These longitudinally disposed pressure bars are adapted to pass between the sections of the studs as shown in Fig. 2 where we have shown six pressure bars employed so that in the convolution of the spiral conveyer one or more of the supporting studs therein will be in alinement with the pressure bars.

The pressure bars 49 are moved longitudinally by expansion springs 52 surrounding the shafts, said spring bearing against a circular plate 53 which is slidably mounted on bolts 54 carried by the ends of the pipes 28, the plate 53 being connected to the pressure bar by rods 55, each rod 55 being surrounded by an additional expansion spring 56 which works against a plate 57 carried by guide bolts 58 secured in the heads of the pipe 28. The rod 55 is provided with a threaded portion carrying a nut 59 forming a stop for the plate 57, and it will be seen by this construction that each pressure bar is held under tension by a main pressure spring and an auxiliary pressure spring so as to equalize the pressure whereby the pressure bars will be drawn longitudinally by the pressure springs in order to force the outer sections of the studs outwardly to throw the spiral conveyer in contact with the inner wall of the oven chamber.

We have found in practice that when the roasting apparatus is in operation the oven chamber expands and in order to compensate for this expansion so as to hold the spiral conveyer sections in contact with the wall of the oven chamber so as to prevent the material from sticking, it is advantageous to have governors arranged to force the sections outwardly.

In the form of governor shown the governor ball 60 is slidably mounted on the slidably mounted stud section 46 so as to engage the section of the spiral conveyer when the same is thrown outwardly by centrifugal force and it will be noticed that in this construction the section of the spiral conveyer at this point is slidably connected to a member 61 carried by studs 62 which are secured within the pipe 28, the weight of the ball and the speed of the shaft regulating the pressure exerted against the section of the conveyer.

Each of the oven chambers is provided with a valve-controlled vent 70 and a needle water spray 71 by means of which water is introduced within the oven chamber in order to regulate the temperature thereof. In constructing the roasting apparatus, each of the oven chambers are preferably provided with a thermometer so that the degree of heat can be determined and regulated by controlling the oven vent and the products of combustion vent.

From the foregoing description it will be seen that we have provided a roasting apparatus which is especially adapted to be used for roasting cereals, but can be used for roasting various other materials and one in which the material to be roasted is delivered into a hopper from which it is fed by gravity into an oven chamber where it is conveyed by a rotary sectional spiral conveyer which agitates the material and prevents the same from burning within the oven chamber, and after being partially roasted it is discharged into the next oven chamber, the same operation being repeated whereby we are able to roast the material quickly and with very little attention.

It will also be seen that by our construction of roasting apparatus the cereal can be fed into the hopper from a spout and into cartons or boxes when delivered from the machine so as to produce a sanitary device whereby the cereal is not handled by the hands of the operator at any time in its passage through the machine.

We claim:

1. A roasting apparatus, comprising a series of superposed units, each unit having an annular oven chamber surrounded by an annular product of combustion chamber, a burner chamber disposed beneath said product of combustion chamber of each unit and communicating therewith, and a conveyer mounted in each oven chamber contacting with the wall of said oven chamber.

2. A roasting apparatus comprising an outer casing having an offset portion provided with a burner chamber, an oven casing disposed within said outer casing forming a combustion chamber communicating with said burner chamber, said oven casing being provided with a fluted base portion extending into the burner chamber, and a pipe disposed concentrically within said oven casing forming an annular oven chamber.

3. A roasting apparatus, comprising a casing having an offset portion provided with a burner chamber, burners disposed within said chamber, an oven casing disposed concentrically within said outer casing forming an annular product of combustion chamber, said oven casing having an enlarged fluted base portion and a series of serrated retarding baffles disposed within said combustion chamber.

In testimony whereof we hereunto affix our signatures.

SAMUEL I. BEAN.
ROBERT M. BIZZELL.

Copies of this patent may be obtained for five cents each, by addressing the "Commissioner of Patents, Washington, D. C."